US012551841B2

(12) United States Patent
Find

(10) Patent No.: US 12,551,841 B2
(45) Date of Patent: Feb. 17, 2026

(54) METHOD FOR REDUCING METHANE EMISSIONS FROM BIOGAS UPGRADING

(71) Applicant: Airco Process Technology A/S, Fredericia (DK)

(72) Inventor: Rasmus Find, Vejle (DK)

(73) Assignee: Airco Process Technology A/S, Fredericia (DK)

( * ) Notice: Subject to any disclaimer, the term of this patent is extended or adjusted under 35 U.S.C. 154(b) by 502 days.

(21) Appl. No.: 18/010,724

(22) PCT Filed: Jun. 15, 2021

(86) PCT No.: PCT/EP2021/066018
§ 371 (c)(1),
(2) Date: Dec. 15, 2022

(87) PCT Pub. No.: WO2021/254980
PCT Pub. Date: Dec. 23, 2021

(65) Prior Publication Data
US 2023/0271128 A1    Aug. 31, 2023

(30) Foreign Application Priority Data
Jun. 15, 2020  (EP) .................................. 20179956

(51) Int. Cl.
*B01D 53/02* (2006.01)
*B01D 19/00* (2006.01)
(Continued)

(52) U.S. Cl.
CPC ..... *B01D 53/1406* (2013.01); *B01D 19/0005* (2013.01); *B01D 53/02* (2013.01);
(Continued)

(58) Field of Classification Search
CPC ......... B01D 53/02; B01D 53/04; B01D 53/14
See application file for complete search history.

(56) References Cited

U.S. PATENT DOCUMENTS

| 4,536,197 A | 8/1985 | Cook |
| 8,840,708 B1* | 9/2014 | Morrow ............. B01D 53/1475 |
| | | 95/208 |

(Continued)

FOREIGN PATENT DOCUMENTS

| JP | H09122432 A | 5/1997 |
| WO | 2018034570 A1 | 2/2018 |
| WO | 2019238488 A1 | 12/2019 |

OTHER PUBLICATIONS

International Search Report issued in corresponding PCT Application No. PCT/NO2021/050095, date mailed Jul. 15, 2021, pp. 1-2.

*Primary Examiner* — Robert A Hopkins
(74) *Attorney, Agent, or Firm* — Robinson & Cole LLP

(57) ABSTRACT

The present invention relates to a method for upgrading biogas generated by a biological process wherein at least carbon dioxide is removed from the bio-gas. More specifically the present invention relates to method for upgrading a biogas comprising a first absorption step wherein the liquid effluent is subjected to a second absorption step and a flash step and the gas streams resulting therefrom are recycled. The present invention also relates a biogas upgrading plant.

31 Claims, 7 Drawing Sheets

Figure 1:
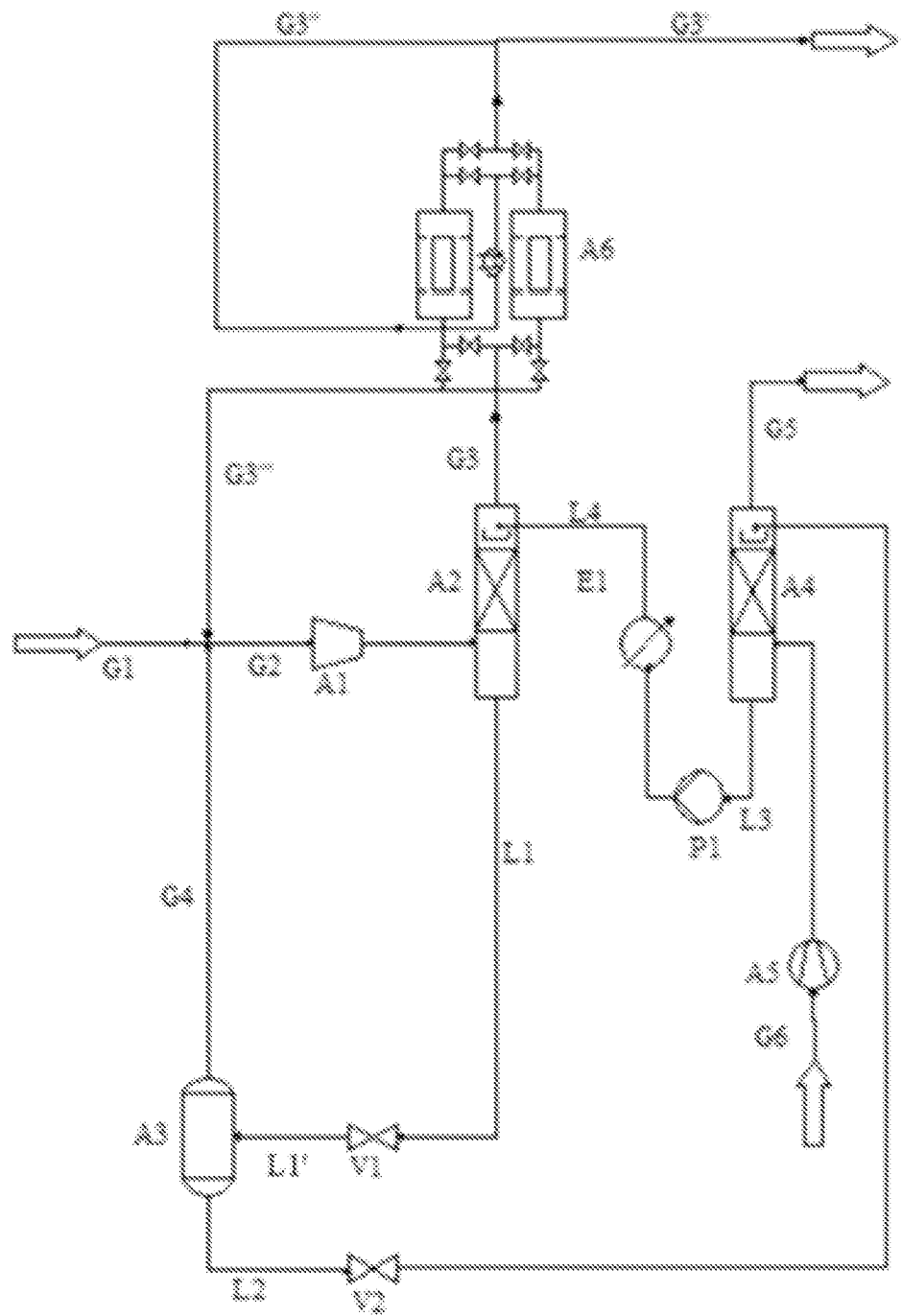

(51) Int. Cl.
*B01D 53/04* (2006.01)
*B01D 53/14* (2006.01)
*C10L 3/10* (2006.01)

(52) U.S. Cl.
CPC ..... *B01D 53/0462* (2013.01); *B01D 53/1418* (2013.01); *B01D 53/1425* (2013.01); *B01D 53/1475* (2013.01); *B01D 53/1487* (2013.01); *C10L 3/104* (2013.01); *B01D 2252/103* (2013.01); *B01D 2252/2021* (2013.01); *B01D 2252/2026* (2013.01); *B01D 2252/20468* (2013.01); *B01D 2257/504* (2013.01); *B01D 2257/7025* (2013.01); *B01D 2257/80* (2013.01); *B01D 2258/05* (2013.01)

(56) References Cited

U.S. PATENT DOCUMENTS

2008/0134754 A1* 6/2008 Funk ................. B01D 53/1475
  73/23.41
2012/0204717 A1 8/2012 Dinnage et al.

\* cited by examiner

METHOD FOR REDUCING METHANE EMISSIONS FROM BIOGAS UPGRADING

CROSS-REFERENCE TO RELATED APPLICATIONS

The instant application is a U.S. National Stage application of and claims priority to PCT/EP2021/066018, filed on Jun. 15, 2021, which is a PCT application of and claims priority to EP Application No. 20179956.6, filed on Jun. 15, 2020, the subject matter of both aforementioned applications is hereby incorporated by reference in their entireties.

FIELD OF TECHNOLOGY

The present invention relates to the upgrading of biogas, biogas being gas generated by a biological process, such as an anaerobic biological process, where the main components of the biogas are methane and carbon dioxide, as well as biogas upgrading means purifying biogas to meet e.g. natural gas pipeline specification.

BACKGROUND

Biogas is gas produced from the biological decomposition of biomass and the biogas comprises methane and carbon dioxide. The biomass can be waste streams from landfills, the agricultural industry, manure, sewage, food production or the like and as such biogas presents an opportunity to convert waste streams into a sustainable and valuable gas product which can be used e.g. as a fuel or as a chemical feed in industrial processes or a precursor. The biological processes used to produce biogas typically provide a biogas with a significant content of carbon dioxide, which may be more than 30% by volume of the biogas. Hence, industrial use of biogas obtained from biological processes requires purifying the biogas as it contains too much carbon dioxide or other undesired compounds such as hydrogen sulphide. Therefore, there is an increasing interest in efficient processes for upgrading biogas to e.g. natural gas standards which allows the upgraded gas to be injected into existing natural gas grids. Such upgraded biogas is sometimes referred to as biomethane or renewable natural gas (RNG). An important part of biogas upgrading process is the removal of carbon dioxide, and in n the following, biogas upgrading will be used to refer to carbon dioxide removal, although the processes described herein may also remove other components such as hydrogen sulphide.

Known processes for carbon dioxide removal are based on e.g. membranes, pressure swing adsorption or absorption processes also called scrubbing processes wherein carbon dioxide in a biogas feed is absorbed in a liquid thereby reducing the carbon dioxide content of the biogas feed. The present invention relates to such absorption processes. Both physical and chemical absorption processes are used, where in the case of physical absorbing media the gas is dissolved in the absorbing medium according to its solubility and its partial pressure, and chemical absorption involves a reaction between the absorbing medium and the absorbed gas. One typically used physical absorbing medium is water and typical chemical absorbing media are amines, but others are available. In physical absorption processes not only carbon dioxide is transferred to the absorbing medium; methane will also be transferred to the physical absorbing medium, representing a methane loss in the process, which is an important factor for commercial viability of a process. Methane loss is especially pronounced for biogas upgrading processes as the high content of carbon dioxide in the biogas requires a large volume of absorbent to remove it. Hence, even though methane will be absorbed to a lesser degree relative to carbon dioxide, the large absorbent volume entails a significant loss of methane. Biogas is obtained at substantially atmospheric pressure from the biogas plant, hence the first step in physical absorption processes is gas pressurization, and the upgrade processes often involve numerous pressurization and heating steps of numerous gas streams which comes at significant utility and operational costs. Various plant designs are seen in industry which seek to reduce methane loss, for example by recycling lost methane by flashing the loaded absorbent to provide a gas fraction which can be recycled to the absorption step. However, recycling of methane streams in biogas upgrade processes comes with increased need for gas pressurization and/or capacity reductions, as the recycled methane streams will contain a significant amount of carbon dioxide compared to other sources which will then also be recycled and pressurized. The processes thus need to balance the cost and environmental impact of methane slip against increased operational costs and/or equipment size, and processes improving on these aspects present a major economic advantage, in particular due to the typically large processing volumes.

Due to the difficulty in designing of plants where recirculating methane is viable, some plant designs instead seek to upgrade the potential methane slip into a secondary methane product.

EP2822673B1 discloses a process for separating carbon dioxide from biogas by using a first and second scrubber column and a first and second stripper column. The biogas is fed to the first scrubber column wherein the carbon dioxide is separated using physical adsorption. The resulting scrubbed biogas is recovered and the charged scrubbing solution is regenerated in the first stripping column (K2) with a stripping gas to yield a residually charged scrubbing solution and a gas mixture. The residually charged scrubbing solution is led to the second stripping column K4 where carbon dioxide is removed and a regenerated scrubbing solution is obtained. The gas mixture of the first stripping column is led to the second scrubber wherein carbon dioxide is removed using the regenerated scrubbing solution, producing a second methane product stream. Apart from the economic disadvantage of introducing additional unit operations, the use of two stripping columns also requires introducing additional gas into the system, which must be first be compressed to be used and then subsequently be removed again, thus increasing the operational cost. The process further yields two separate methane products streams, where one has a low content of methane which may be disadvantageous in some applications.

An object of the invention is to provide an alternative or improved process for upgrading biogas and more preferably processes in which improvements are made regarding one or more of the methane slip, purity or power consumption while providing an upgraded biogas of sufficient quality.

SUMMARY OF THE INVENTION

These and further objects are met in a first aspect of the invention providing a method for upgrading a biogas stream comprising methane and carbon dioxide, comprising the steps of:
a. feeding the biogas stream and a first liquid physical absorbing agent to a first absorber, b. absorbing carbon dioxide and methane from the biogas stream into the first physical absorbing agent thereby obtaining a first gas effluent having a lower content of carbon dioxide than the biogas stream and a first liquid effluent having higher content of carbon dioxide than the first absorbing agent,
c. feeding, and optionally depressurizing, the first liquid effluent to a second absorber and feeding a second liquid physical absorbing agent to the second absorber, whereby carbon dioxide released from the, optionally depressurized, first liquid effluent is subsequently absorbed into the second physical absorbing agent, thereby obtaining a second gas effluent comprising methane and a second liquid effluent having a lower content of methane than the first liquid effluent,
d. depressurizing and feeding the second liquid effluent into a flash unit,
e. flashing the depressurized second liquid effluent thereby obtaining a flash gas effluent comprising methane and a flash liquid effluent having a lower content of methane than the second liquid effluent,
f. feeding the flash gas effluent into the second absorber or into the biogas stream of step a.,
g. feeding the second gas effluent into the first absorber optionally through the biogas stream of step a., and
h. recovering or further processing the first gas effluent as an upgraded biogas stream.

By depressurizing and treating the first liquid effluent in the second absorber, the released gasses will be contacted with the second physical absorbing agent and as the partial pressure of carbon dioxide is higher than that of methane in the gas phase of the second absorber, relatively more carbon dioxide will be absorbed in the second absorbing agent, resulting in a second absorber gas effluent which is rich in methane. Thus, the step reduces methane slip, and additionally the second gas effluent has a methane purity which is high enough to be viable to recycle into the biogas stream, thus efficiently reducing methane slip. As the methane purity in the gas effluent of the second absorber is high, the total flow rate of the second gas effluent is less than that of a less pure recycle stream, which makes it efficient to recycle, lowering power consumption and freeing capacity in the first absorber.

The flash process in the flash unit further reduces the methane loss of the biogas upgrade process and the resulting flash gas effluent is recycled. It may be recycled by feeding it into the second absorber where it strips methane from the first liquid effluent. As an alternative option, the gas effluent may be recycled into the first absorber, bypassing the second absorber, by adding it to the biogas stream of step a. The flash gas effluent could alternatively be fed directly to the first absorber by way of a separate compressor.

The second gas effluent is recycled by feeding it to the first absorber, which can optionally be achieved by feeding it to the biogas stream of step a.

In the option where the first liquid effluent is not depressurized in step d., the first and second absorber will have substantially the same operating pressures. Hence, in this option the flash gas effluent is fed to the second absorber and the second gas effluent is fed into the first absorber, for example by feeding it into the biogas stream. Hence, the first liquid effluent may optionally be depressurized, with the proviso that if the first liquid effluent is not depressurized, the flash gas effluent is fed to the second absorber. In the second absorber the gas will strip the first liquid effluent of methane as the gas has a high purity of carbon dioxide, and carbon dioxide released from the first liquid effluent by being stripped will be absorbed in the second primary absorbing agent. Hence, methane loss is reduced and the recycle stream flow rate is reduced. Feeding the flash gas effluent into the second absorber may involve pressurizing the flash gas effluent prior to feeding it into the second absorber.

The method according to the invention thus optimizes the gas stream which is recycled to the first absorber, by including a second absorber, which second absorber operates at a lower pressure than the first absorber, and/or by using the flash gas effluent to strip the first gas effluent in the second absorber.

The biogas stream may be pressurized using e.g. a compressor prior to feeding it to the first absorber. When the flash gas effluent or the second gas effluent is fed to the biogas stream it may suitably be fed to the biogas prior to pressurization and pressurized along with the biogas stream.

Preferably the first absorber and second absorbers are operated in a counter-current configuration.

Feeding the second gas effluent and potentially the flash gas effluent into the biogas stream may involve obtaining a mixed biogas stream therefrom. The term mixed biogas is used herein to denote a gas stream resulting from mixing the biogas with recycled gas streams, such as the second gas effluent, flash gas effluent and potentially a spent regeneration stream from a drying process as will be described below. It is understood than when gas streams are recycled into the biogas stream, no particular order is intended, and it may be done as is practical e.g. by considering the pressures of the streams to be mixed. Hence, the flash gas effluent and second absorber effluent may be added to the biogas stream in a sequential manner or combined prior to adding them to the biogas stream. The mixed biogas stream may be pressurized in a compressor prior to feeding to the first absorber. The flash gas effluent and second gas effluent may be combined to form a recycle gas stream which is fed into the biogas stream. The term "recycle gas stream" as used herein is a collective term denoting a gas stream which is recycled to the first absorber. Hence the flash gas effluent may be combined with the second gas effluent to form the recycle gas stream. In other embodiments where the flash gas is fed to the second absorber, the second gas effluent may be denoted the recycle gas stream.

Depressurizing the first liquid effluent may be done prior to feeding it into the second absorber, e.g. by a throttle valve, such that a depressurized first liquid effluent is fed to the absorber. This may provide a simple process. Alternatively, the stream may be depressurized and fed to the absorber simultaneously. Suitably, the first liquid effluent is depressurized by at least 0.5 bara, preferably at least 1 bara.

The second liquid effluent may be further processed.

The first gas effluent from the first absorber can be recovered as the upgraded biogas or alternatively it can be further processed if necessary.

Suitably, the method further comprises the steps of:
i. feeding the flash liquid effluent and a stripper gas feed into a stripper unit, and
j. stripping the flash liquid effluent with the stripper gas feed thereby obtaining a stripper gas effluent having a higher content of carbon dioxide than the stripper gas feed and a regenerated physical absorbing agent.

By stripping the dissolved gasses from the second flash effluent, the physical absorbing agent is regenerated and may be re-used.

The stripper gas feed may suitably be air, but other gases can be considered such as e.g. nitrogen or oxygen. An operating pressure of the stripper unit may be lower than an operating pressure of the flash unit, which may facilitate the release of dissolved gases into the stripping gas.

In addition to increasing methane production and reducing methane emission, reducing the methane slip may also provide a stripper gas effluent from which is easier and less costly to purify and obtain a carbon dioxide product. Carbon dioxide at a high purity can be a secondary product from a biogas upgrade process and reducing the methane content of the loaded absorbing agent reduces the content of methane in the stripper effluent gas and thus also reduces need for additional purification of the effluent gas to provide a carbon dioxide product.

Suitably, the method further comprises the steps of:
feeding the flash liquid effluent to a regeneration unit, and
regenerating the flash liquid effluent thereby obtaining a regenerated physical absorbing agent.

Regenerating the flash liquid effluent is understood to be the release of physical absorbed gases therein, whereby the physical absorbing agent can be re-used. Regeneration may be achieved by a stripping process as described above. Alternatively, it could be achieved by heating the flash liquid effluent, in which case the regeneration unit may be a reboiler. The choice of regeneration process may depend on which physical absorbing agent is used.

Suitably, the method further comprises the steps of:
k. feeding a first portion of the regenerated physical absorbing agent from step j. as the first physical absorbing agent of step a. and feeding a second portion of the regenerated absorbing stream from step j. as the second physical absorbing agent of step c.

Recycling the physical absorbing agent as the first and second physical agent requires pressurizing them to the operating pressures of the first and second absorber. This may be achieved using a single pump which may provide a simpler process. Alternatively, a pump for each of the first and second absorbing agents may be used.

Suitably, a method is provided, wherein the flash gas effluent is compressed and fed into the second absorber, and the second gas effluent is fed into the biogas stream.

By feeding the flash gas effluent into the second absorber, the flash gas effluent which has a high concentration of carbon dioxide will have the effect of stripping off methane from the liquid phase in the second absorber. Furthermore, carbon dioxide in the flash gas effluent may absorb into the liquid phase of the second absorber. Thus, the methane loss of the process is further reduced and the flow rate of the second gas effluent may be less than the sum of the flow rates of the flash gas effluent and second gas effluent in this configuration. Thus, the second gas effluent may be the result of the gas released by depressurization of the first liquid effluent, gas stripped by the flash gas effluent, and gas from the flash gas effluent which is not absorbed in the second absorber. The second gas effluent can therefore be denoted as the recycle gas stream.

Suitably, there is provided a method where in step c. the first liquid effluent and flash gas effluent are fed into the second absorber at a first position and second position respectively, wherein the second position is below the first position in a height direction of the second absorber.

Feeding the flash gas effluent below the feeding position of the first liquid effluent, an increased contact time between the gas and liquid phases is possible, improving the mass transfer in the second absorber. The height direction of the absorber is the direction extending from a bottom to a top of the second absorber, wherein a counter-current liquid is fed at the top and gas is fed at the bottom of the absorber. The flash gas effluent may be fed into a liquid sump of the second absorber, e.g. through a sparger or diffuser.

Suitably, the operating pressure of the first absorber and second absorber (A3) are substantially the same, and the second gas effluent is fed to the first absorber of step a. When the absorbers have the same operating pressure, the flash gas effluent is fed to the second absorber to strip methane and carbon dioxide from the first liquid effluent. At least part of the released gas is then absorbed by the second physical absorbing agent.

Suitably, the biogas stream is obtained directly from a biogas production unit.

The biogas production unit is a plant which produces the biogas by decomposing biological material. The biogas production unit may be an anaerobic digester. Waste in a landfill can be decomposed by microorganisms, producing a biogas which is sometimes referred to as landfill gas, hence a landfill can also be considered a biogas production unit. Methods according to the invention are advantageously used for upgrading a biogas which is obtained directly from the biogas production unit. This biogas will generally be provided at low pressure and have a high content of carbon dioxide. The high content of carbon dioxide requires a large volume of physical absorbing agent, which leads to a high amount of methane in the loaded physical absorbing agent. The method according to the invention provides a means for efficiently recycling the methane from the loaded physical absorbing agent which reduces the amount of carbon dioxide which is recycled alongside the methane without losing methane. As the biogas is provided at low pressure, the biogas upgrade process requires pressurization. The utility cost of gas compression may be a significant factor in determining the commercial viability of an upgrade process, especially when gas recycle streams pose additional need for gas compression. The method according to the invention provides efficient biogas upgrading at relatively low pressures, generally below 16 bara, and as the amount of carbon dioxide in the recycle streams are reduced, the total flow rate of recycled gas is reduced, and hence the utility cost of compressing carbon dioxide in the recycle is reduced.

The pressure at which the biogas stream is provided may be about 1 to 1.5 bara, prior to being pressurized for feeding into the first absorber. Biogas production units typically operate at or slightly above atmospheric pressure conditions, and hence the biogas feed to the upgrade process is also at these low pressures. The upgrade process according to the invention allows for efficiently upgrading the biogas at pressures below 16 bara, even below 12 bara and even below 8 bara, and thereby reducing power consumption associated with gas compression.

Biogas streams typically have a mass ratio of carbon dioxide to methane at or above 1:2 such as in the range of 3:1 to 1:2, suitably in the range of 2:1 to 1:1. A mass ratio above 1:2 is understood to be a carbon dioxide per methane mass content exceeding 1:2, such as 1:1 or 2:1. As described above, the high carbon dioxide content of biogas poses a significant issue in terms of preventing methane loss, due to the large volume of physical absorbing agents. Hence, the processes according to the invention, where the methane slip is efficiently reduced by improving the gas recycle, are especially suited for upgrading biogas containing a large amount of carbon dioxide. The carbon dioxide to methane ratio is calculated on mass basis, as the fraction of carbon dioxide to methane in the biogas stream. The ratio could also be expressed in terms of moles, or by volume by assuming the biogas stream to be an ideal gas. The composition of a biogas stream can be determined by gas chromatography (GC), suitably GC-MS, FID, TCD or a combination thereof.

Suitably, the first and second physical absorbing agent are selected from water, methanol, N-methylpyrrolidon (NMP) or mixtures of dimethyl ethers of polyethylene glycol. It is preferred that the absorbing agent of the first and second absorber are the same.

Physical absorbing agents which are mixtures of dimethyl polyethylene are available commercially such as Selexol™. Another commercially available solvent is Genosorb®. Absorbing agents such as Selexol™ or Genosorb® may also absorb water from the biogas stream, and thus provide a first gas effluent, where water separation is not needed in further processing.

Suitably, a method is provided wherein an operating pressure of the first absorber is about 3 bara to 16 bara, such as about 5 to 8 bara or 8 to 12 bara. The operating pressure of the first absorber may be at least 3 bara. In embodiments where the pressure of second absorber and the first absorber are substantially the same, the above pressures are also suitable.

Such a pressure may provide an efficient absorption process in the first absorber.

Suitably, there is provided a method wherein an operating pressure of the second absorber is at about 2 to 8 bara, such as about 3 to 5 bara.

This may provide a pressure reduction between the first and second absorber which may release an amount of gas from the first liquid effluent which significantly reduces methane loss, while balancing the total flow rate of the recycle gas stream to not have a detrimental effect on the production rate and/or specific power consumption, which exceeds the value of the methane loss reduction. In preferred embodiments the pressure of the second absorber is lower than the pressure of the first absorber.

Suitably, there is provided a method, wherein an operating pressure of the flash unit is about 1.5 bara to 6 bara, such as about 1.5 to 3 bara.

This may provide a pressure reduction between the flash unit and second absorber which may release an amount of gas from the second liquid effluent which significantly reduces methane loss, while balancing the total flow rate of the recycle gas stream to not have a detrimental effect on the production rate and/or specific power consumption, which exceeds the value of the methane loss reduction.

As can be seen in the accompanying examples the operating pressures of the method are below 16 bara, which is advantageous as biogas is provided at low pressures as described above, and power consumption for gas compression can be a significant factor in the commercial viability of the process.

Suitably the method further comprises the steps of:
l. feeding the first gas effluent into a separation unit,
m. separating physical absorbing agent contained in the first gas effluent from the first gas effluent, thereby obtaining a dry gas effluent having a lower content of physical absorbing agent than the first gas effluent and recovering or further processing the dry gas effluent as an upgraded biogas stream.

In some processes according to the invention the partial pressure of the first absorbing agent in the first gas effluent may be high enough to warrant removing it by further processing. This may be the case in processes using water as the absorbing agent, but the term "dry gas effluent" should not be understood so as to limit the separation step to processes removing water.

The separation unit may be a temperature swing adsorption (TSA) dryer, the TSA dryer comprising at least two adsorption units, and wherein the method further comprises the steps of: using a portion of the dry gas effluent to regenerate the at least two adsorption units, thereby obtaining a spent regeneration stream.

The spent regeneration stream maybe fed into the biogas stream, whereby the spent regeneration stream, the biogas stream and the recycle gas stream are combined to form the mixed biogas stream. In this way the methane in the spent regeneration stream is recovered. Adding the spent regeneration stream to the biogas stream does however increase the flow rate of the mixed biogas stream which is fed to the first absorber. This will utilize part of the capacity necessitating a reduce in the flow rate of the biogas stream.

Alternatively, the spent regeneration stream may be compressed and fed to the first gas effluent instead of feeding it into the biogas stream. This allows the spent regeneration stream to be recovered without increasing the flow rate of the mixed biogas stream. By not recycling the spent regeneration stream into the biogas stream, capacity is freed up in the first absorber providing increased production at the same capacity and reduce the specific power consumption.

Alternatively, the spent regeneration stream may be compressed in a compressor, cooled in a cooler to obtain a recovered regeneration stream and a condensed stream. Cooling the spent regeneration stream will condense the absorbing agent out of the spent regeneration stream and to form the condensed stream. This may increase production at the same capacity and reduce the specific power consumption.

Suitably, a method is provided there is provided a method wherein the separation unit is a temperature swing absorption (TSA) dryer comprising at least three adsorption units, and step m. comprises the steps of:
adsorbing physical absorbing agent from the first gas effluent in a first of the adsorption unit, thereby obtaining an intermediate dry gas effluent,
feeding a first portion of the intermediate dry gas effluent to a second adsorption units as a regeneration stream,
regenerating the second adsorption unit with the regeneration stream, thereby obtaining a spent regeneration stream,
adsorbing physical absorbing agent from the spent regeneration stream in a third adsorption unit, thereby obtaining a recovered regeneration stream,
adding the recovered regeneration stream to a second portion of the intermediate dry gas effluent, thereby obtaining the dry gas effluent, and
recovering the dry gas effluent as an upgraded biogas.

Providing a TSA dryer having three adsorption units allows for the recovery of the spent regeneration stream without recycling it into biogas stream. The TSA dryer having three adsorption units is capable of being driven by plant operating pressure, i.e. the pressure of the first gas effluent is sufficient to drive the regeneration stream through the second adsorption unit and the spent regeneration stream through the third adsorption unit and into the dry gas effluent, without the need for pressurizing the first gas effluent or any of the gas streams branched therefrom. The plant operating pressure is in this context the operating pressure of the first absorber. As the TSA dryer eliminates the need of recycling spent regeneration gas into the first absorber, capacity is freed in the first absorber and in the compressor used to pressurize the mixed biogas stream, resulting in increased production at the same capacity.

Suitably a method is provided wherein the operating pressure of the first absorber drives the gas flows in the at least three adsorption units. The pressure differential between the first gas effluent and the dry gas effluent may be in the range of 0.1 to 0.5 bar, 0.2 to 0.4 bar, or about 0.3 bar.

Although the TSA-drier with three absorption units is described above as part of the biogas upgrade method, it could potentially be used in other biogas upgrade processes for drying a gas effluent of an absorption unit.

Suitably, the method has a methane loss of less than 0.5% (w/w), preferably less than 0.4% (w/w), less than 0.3% (w/w), less than 0.2% (w/w) or less than 0.1% (w/w).

Suitably, the method has a specific power consumption of less than 250 W/NM$^3$ methane, preferably less than 240 WNW methane.

Depending on the desired level of methane loss, a first portion of the first liquid effluent may suitably be fed to the second absorber and a second portion of the first liquid effluent may be fed to the flash unit.

In another aspect of the invention there is provided a method for upgrading a biogas stream comprising methane and carbon dioxide, the method comprising the steps of:
a. feeding the biogas stream into a first absorber, the first absorber having a first section and a second section, wherein the first section is positioned above the second section, and the biogas stream is fed to the first absorber at a position between the first and second sections of the first absorber,
b. feeding a first liquid physical absorbing agent to the first absorber at a position above the first section,
c. absorbing carbon dioxide and methane from the biogas stream into the first physical absorbing agent thereby obtaining a first gas effluent having a lower content of carbon dioxide than the biogas stream and a first liquid effluent having higher content of carbon dioxide than the absorbing stream,
d. depressurizing and feeding the first liquid effluent into a flash unit (A3),
e. flashing the depressurized first liquid effluent thereby obtaining a flash gas effluent comprising methane and a flash liquid effluent having a lower content of methane than the second liquid effluent,
f. compressing and feeding the flash gas effluent into the first absorber (A2) at a position below the second section of the first absorber,
g. recovering or further processing the first gas effluent as an upgraded biogas stream.

By providing an absorber having a first and second section the biogas fed below the first section is contacted with the first physical absorbing agent which flows countercurrently to the gas, thereby transferring carbon dioxide to the liquid. Once the liquid has passed the first section it flows through the second section where it is contacted with the flash gas effluent, hence the first liquid effluent is collected from below the second section. As the flash gas effluent has a high purity in carbon dioxide, methane trapped in the liquid of the second section is stripped into the gas phase, while carbon dioxide is transferred into the liquid. This provides a process which may reduce methane loss, increase biogas production and reduce specific power consumption.

The first and second sections of the first absorber could be separate absorbers instead of two sections of the same absorber.

In another aspect there is provided biogas upgrading plant configured for using a method as described herein.

The term "methane loss" is understood to be the fraction of methane lost in the process, that is the methane in the biogas which is not recovered in the upgraded biogas. Lost methane may be residual methane dissolved in the flash liquid effluent. Methane loss may be referred to as methane slip.

The term "specific power consumption" is understood to be the power consumption of the method or plant per amount of methane produced in the biogas. The power consumption may be the sum of the power consumed in compressors and pumps.

The term "flow rate" as used herein refers to a mass flow rate unless otherwise specified.

The term "depressurize" as used herein in the meaning "reduce the pressure" and is not limited to a pressure reduction to a specific value, such as an ambient pressure.

The term "operating pressure" of a specific step or unit is unless otherwise specified the pressure of the gas effluent of the step or unit. Hence, the operating pressure of the first absorber is the pressure of the first gas effluent, and the operating pressure of the second absorber is the pressure of the second gas effluent.

The biogas upgrade processes disclosed herein make use of physical absorbing agents, where methane and carbon dioxide are absorbed and dissolved in the physical absorbing agent.

Features described in relation to one embodiment can also apply to other embodiments unless otherwise stated. Similarly, features described with reference to one aspect of the invention can also apply to other aspects unless otherwise stated.

DETAILED DESCRIPTION

Figure 2:
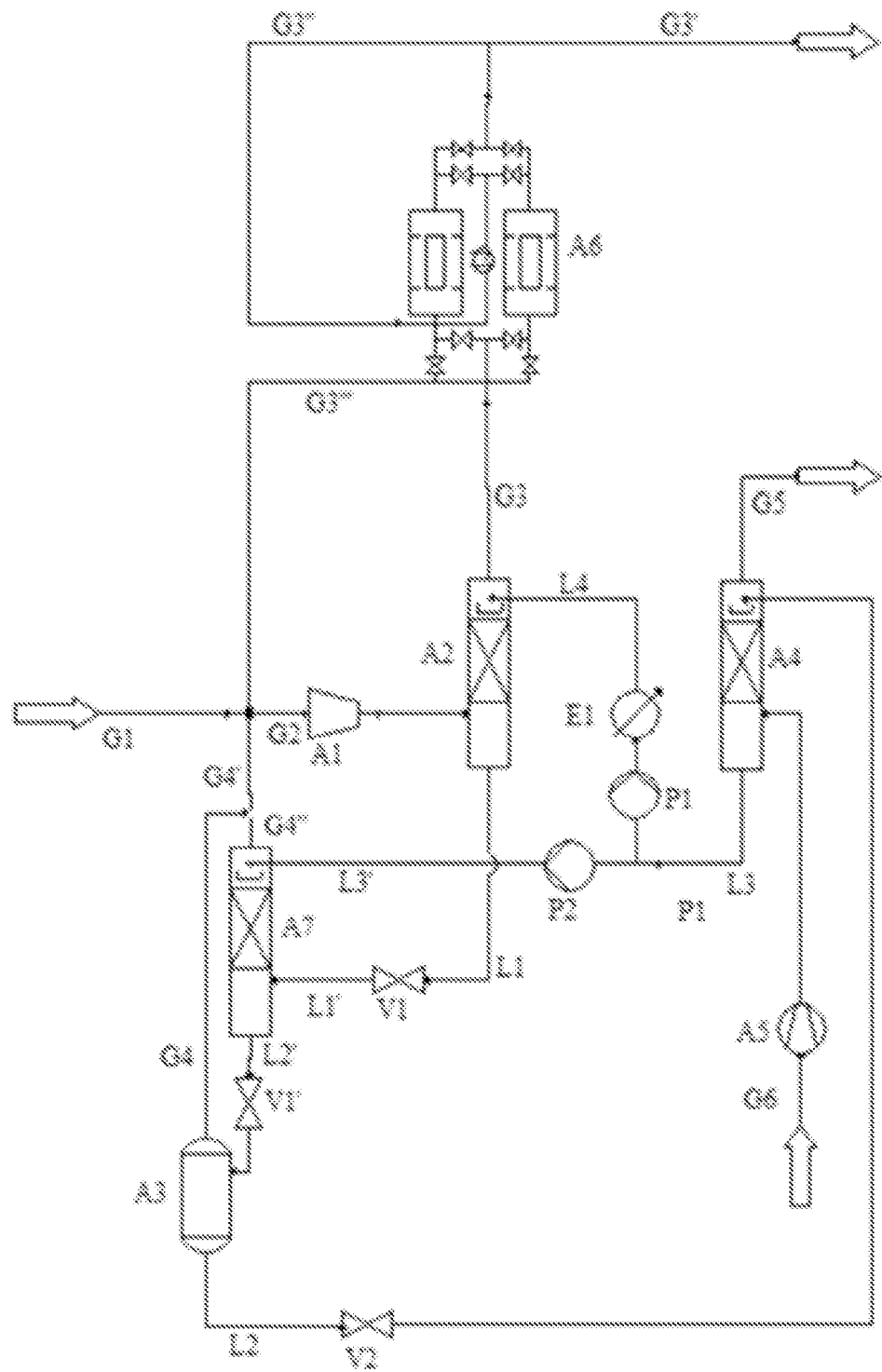
Figure 3:
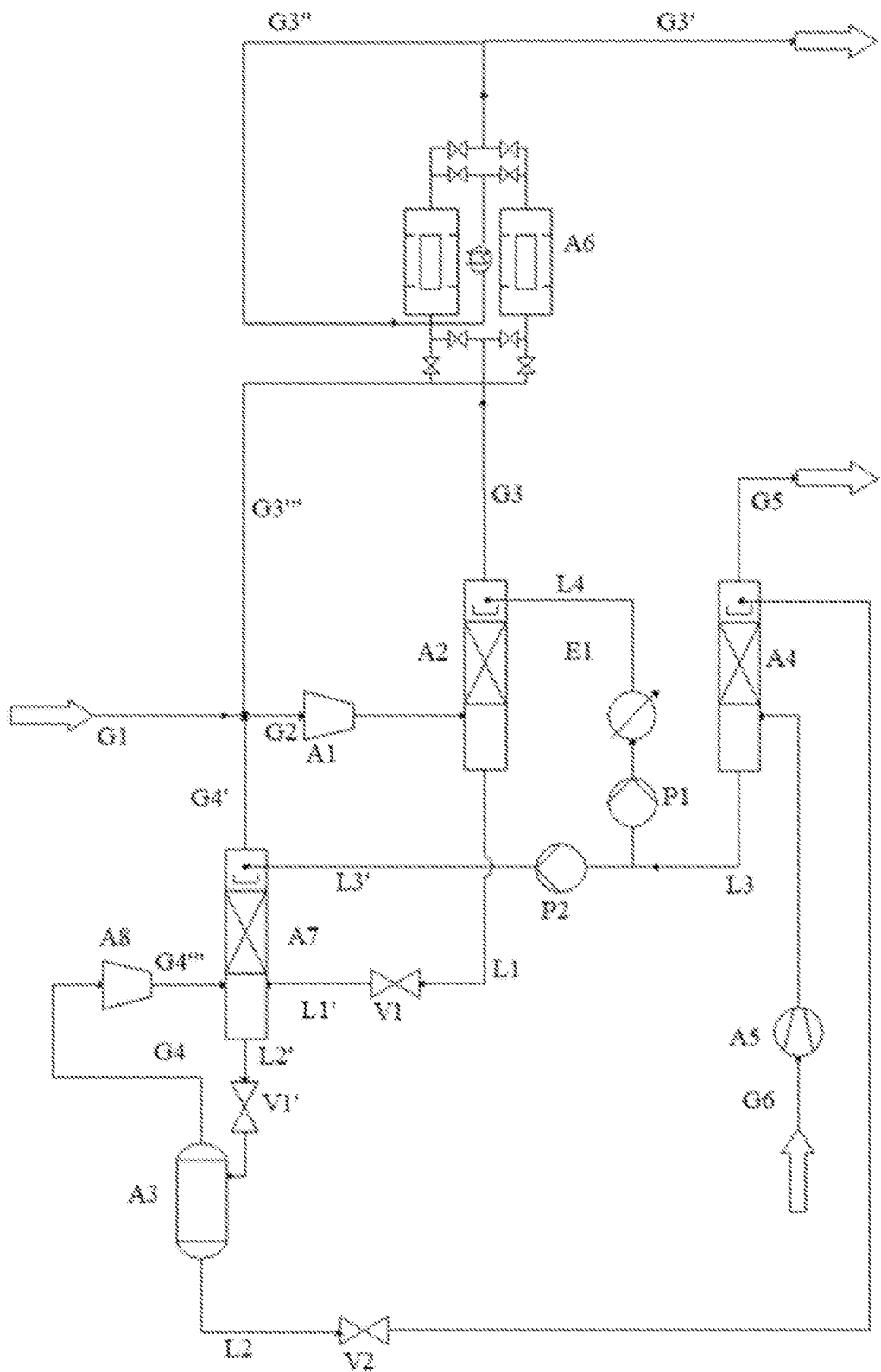
Figure 4:
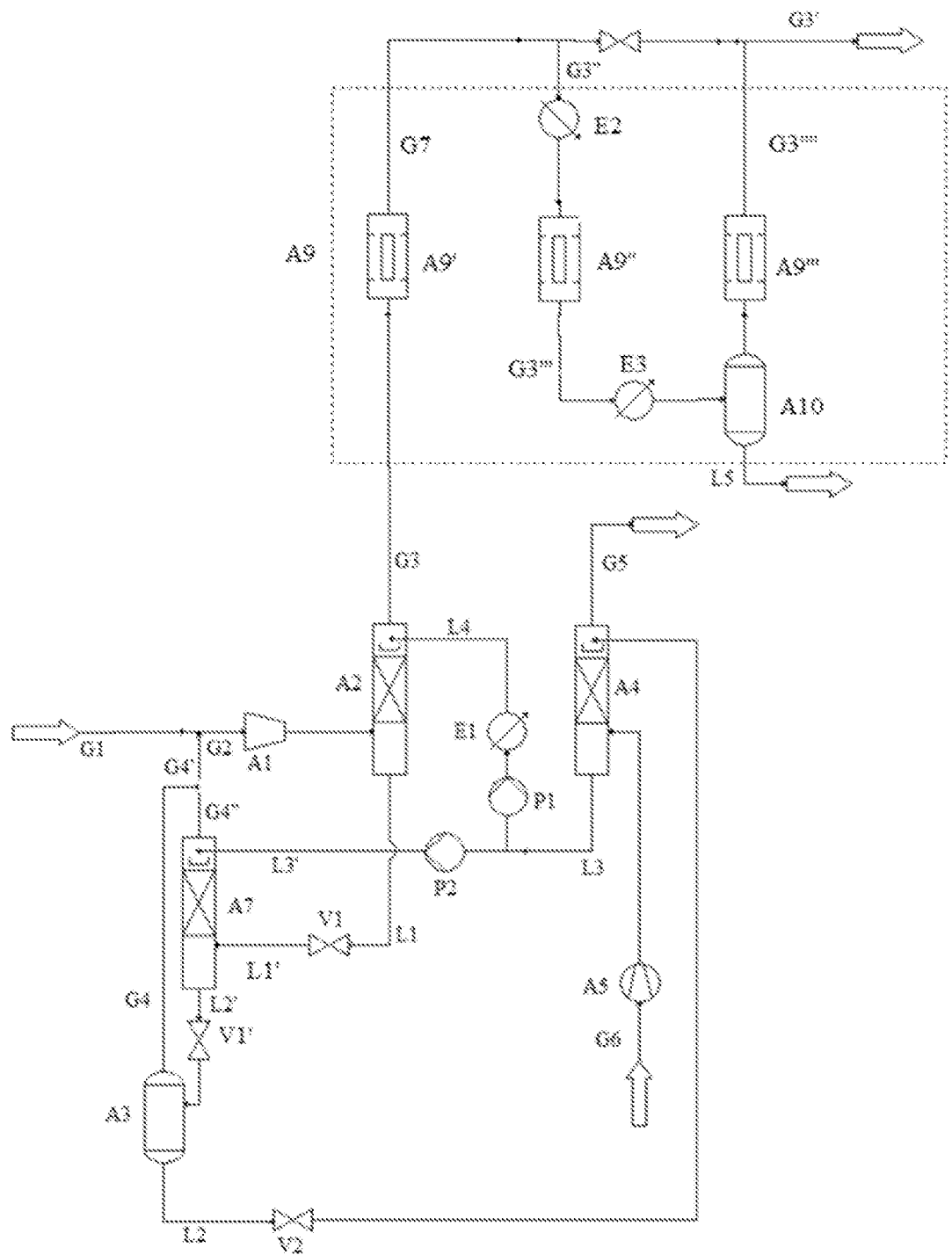
Figure 5:
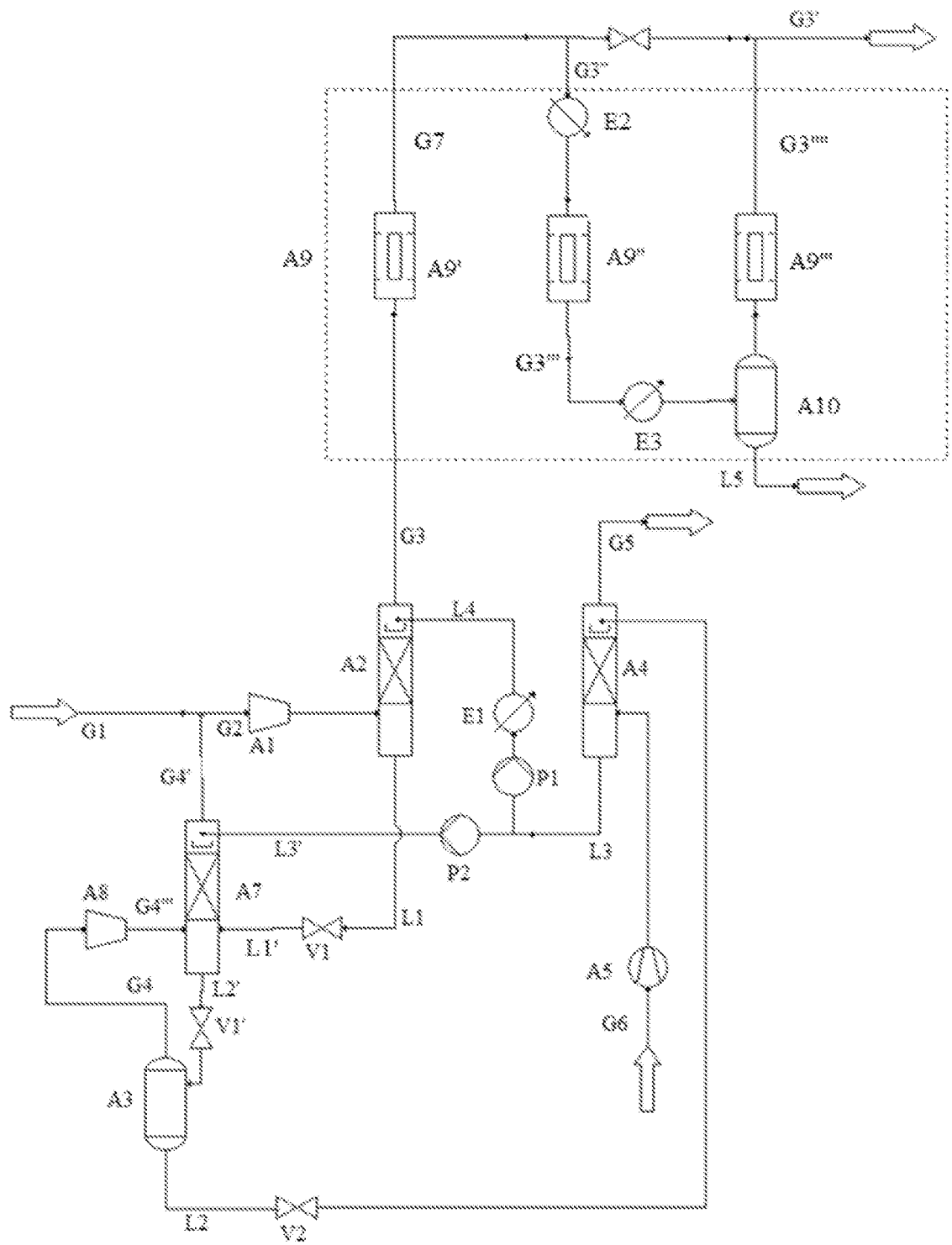
Figure 6:
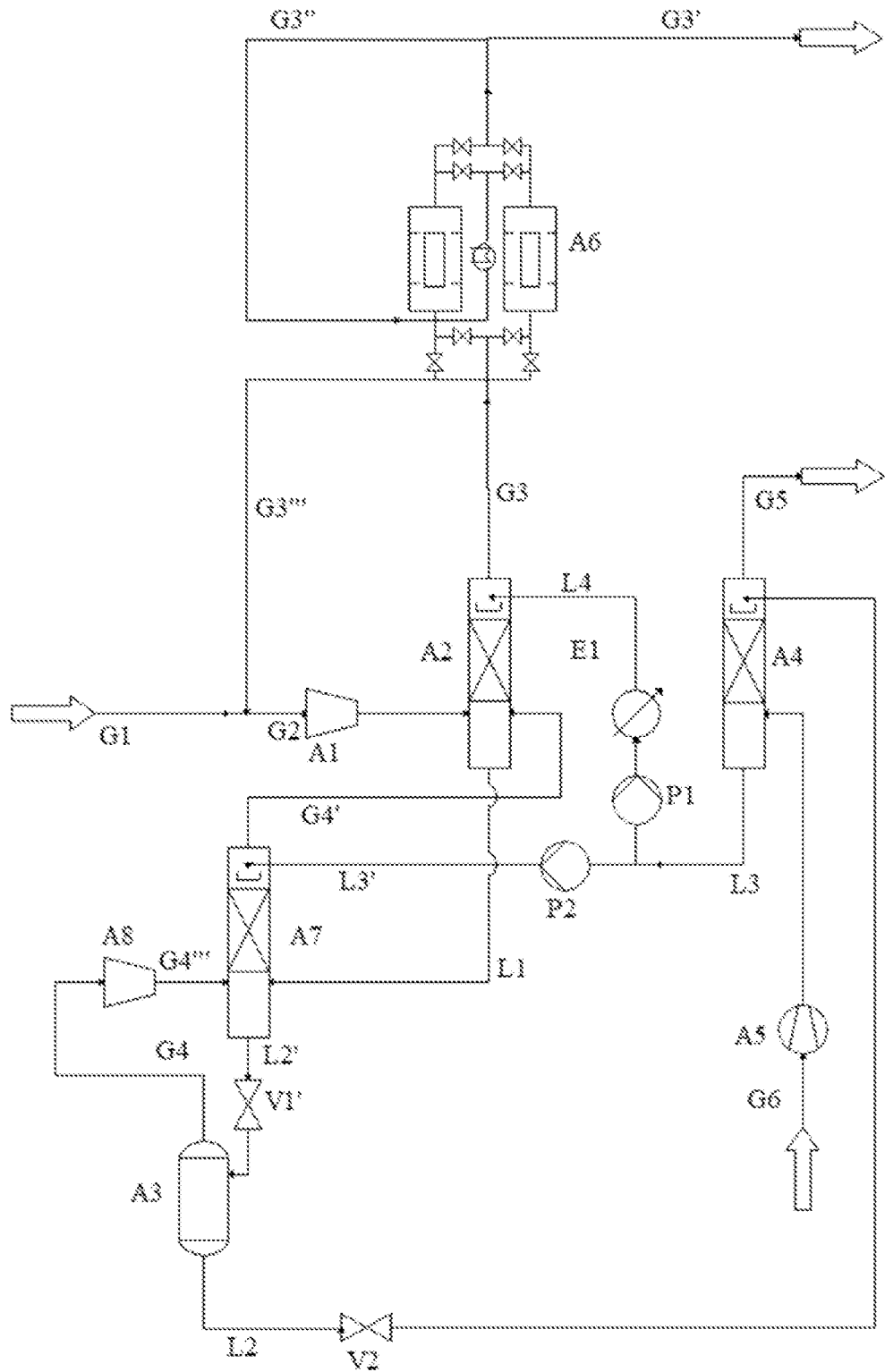
Figure 7:
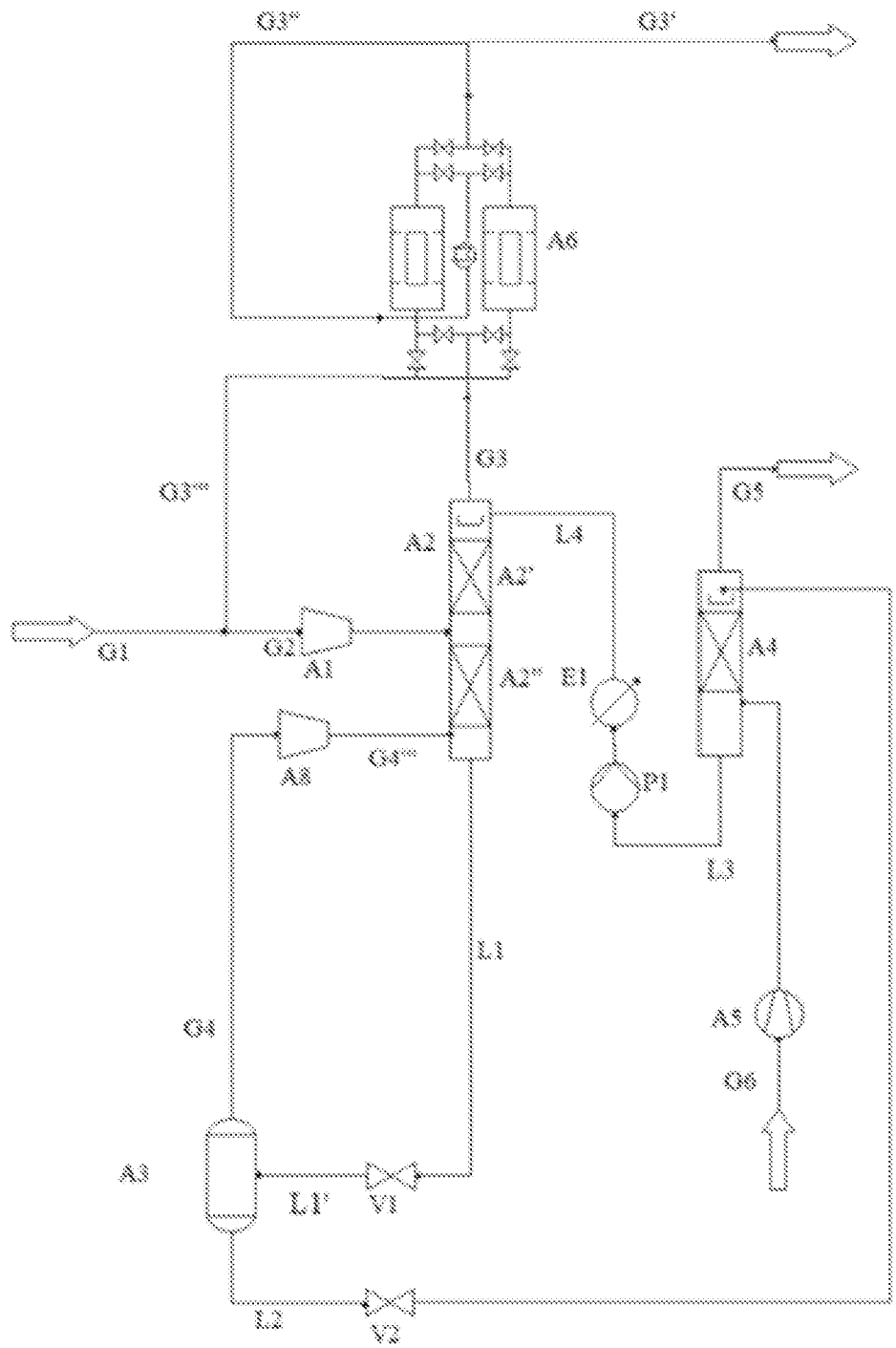

In the following the invention is described with reference to the non-limiting examples and drawings, where FIG. 1 shows a process diagram of biogas upgrade plant known in the art, FIG. 2 shows a process diagram of a process according to the invention having a second absorber unit, FIG. 3 shows a process diagram of another process according to the invention wherein the flash gas effluent is fed into the second absorber, FIG. 4 shows a process diagram of the process of FIG. 2, with a TSA dryer unit operated by plant pressure, FIG. 5 shows a process diagram of the process of FIG. 3, with a TSA dryer unit operated by plant pressure, FIG. 6 shows a process diagram of a process having two absorbers with the same operating pressure, and FIG. 7 shows a process diagram of a process having one absorber with two absorbing sections.

DETAILED DESCRIPTION

FIG. 1 shows a process diagram of a known biogas upgrade plant. A biogas stream G1 containing carbon dioxide and methane is fed to the plant where it is mixed with spent regeneration stream G3''' and flash gas effluent G4 to form a mixed biogas stream G2. The mixed biogas stream G2 is compressed in a compressor A1. After compression the mixed biogas G2 may be cooled (not shown) prior to feeding it to the bottom of the first absorber A2. At the top of the first absorber A2 a first absorbing agent L4 is fed as a liquid stream. The biogas and first absorbing agent are contacted in the first absorber A2, thereby generating a first liquid effluent L1 which has an increased content of carbon dioxide compared to the first absorbing agent L4 and a first gas effluent G3 which has a lower content of carbon dioxide than the biogas. G3 is thus methane-rich.

In this process the first physical absorbing agent is water. The first gas effluent G3 will contain some water in vapor form. To obtain a biogas of natural gas grid quality, a gas dryer A6 is used to remove the absorbing agent from the first gas effluent G3. In FIG. 1. a TSA-dryer unit which has two adsorption units is shown. When the dryer unit A6 is in operation, one adsorption unit is in operation mode, drying the inflowing gas, and one is in regeneration mode, the inflowing gas regenerating the adsorbing agent. The first gas effluent G3 is fed to the adsorption unit in operation mode and passed through an adsorption bed and the absorbing agent will adsorb to the adsorption bed, thereby removing it from the first gas effluent. The dried first gas effluent G3' at the outlet of dryer unit A6 is the upgraded biogas. A portion of the dried first gas effluent G3' is recycled to dryer A6 as regeneration stream G3". The regeneration stream G3" is then led to the adsorption unit which is in regeneration mode. A regeneration cycle comprises a heating phase and a cooling phase. In the heating phase, the regeneration stream G3" is heated by means of a heater prior to being fed to the adsorption unit. The heated regeneration stream will drive out adsorbed absorbing agent from the adsorption bed and into the regeneration stream G3". Once the heating phase is completed, the heater is stopped and regeneration stream G3" will be fed to the adsorption unit to cool it. The regeneration stream used for the regeneration cycle is the spent regeneration stream G3''', which is recycled into the biogas stream G1 by the suction of compressor A1. The recycle of the spent regeneration stream G3''' is done so as not to lose the methane contained therein.

The first liquid effluent L1 which is rich in carbon dioxide also contains some methane. To reduce the loss of methane, the first liquid effluent L1 is depressurized using valve V1 and fed to a flash unit A3. The pressure in flash unit A3 is less than the pressure in first absorber A2 and since the dissolved carbon dioxide and methane are bound physically in the first liquid effluent L1, a portion thereof releases into the gas phase due to the pressure reduction, thereby generating flash gas effluent G4 at the top of flash unit A3 and flash liquid effluent L2 at the bottom of flash unit A3. The flash liquid effluent L2 has a lower amount of dissolved gases compared to the first liquid effluent L1. Flash gas stream G4 which comprises methane and carbon dioxide is recycled into the biogas stream G1 by the suction of compressor A1 and is mixed with the biogas stream G1 and spent regeneration stream G3''' yielding the mixed biogas stream G2. The flash gas effluent G4 here constitutes a recycle gas stream.

After reduction of methane loss in the flash unit A3, flash liquid effluent L2 is led to the top of stripper unit A4, through valve V2 wherein the pressure is reduced. A Stripper gas feed G6 consisting of air is compressed by means of blower A5 and led to the bottom of stripper unit A4. In stripper unit A4 liquid and gas flows counter-currently and by their contact dissolved gasses in the liquid are stripped into the gas phase, thereby generating a regenerated absorbing agent L3 which is lean in dissolved gases and a stripper gas effluent G5 which contains the residual carbon dioxide and methane which were dissolved in flash liquid effluent L2. The regenerated absorbing agent L3 is pressurized by pump P1, cooled in cooler E1 and then fed back to the first absorber A2 where it is reused as the first absorbing agent L4.

A well-known problem related to the process of FIG. 1 is the associated methane loss. Methane loss has an economic cost and environmental impact. The methane loss is caused by methane which is trapped in the stripper gas effluent G5, which will typically be released to the atmosphere. One way to reduce the environmental impact is by catalytic or thermal combustion of the methane in the stripper gas effluent G5. However, the methane loss is then converted to carbon dioxide and if the associated released energy cannot be efficiently utilized, the lost methane will not replace fossil fuel consumption. Furthermore, combustion of the methane does not address the economic loss represented by the methane loss. Hence combustion of the methane is an inefficient way to address methane loss both in terms of environmental and economic impact.

In the process of FIG. 1, the methane loss is reduced by the pressure reduction in the flash unit A3. The flashing process recovers part of the methane in the first liquid effluent L1, which is then recycled into the process as flash gas effluent G4. Further decreasing the pressure in A3 reduces the methane loss, however it will also increase the flow rate of flash gas effluent G4, which will increase the flowrate of mixed biogas stream G2 which is fed to the first absorber A2. Additionally, the spent regeneration stream G3''' recycled from the dryer A6 will also increase the flow rate of mixed biogas stream G2. The increased flow of mixed biogas stream G2 results in the need of a larger compressor A1 and/or a larger absorber A2. Furthermore, a consequence of a larger mixed biogas stream G2 is an increased specific power consumption. The increased recycle gas stream could also be accommodated by reducing the flow rate of biogas stream G1, making it possible to use the same compressor, but at the cost of reduction upgraded methane production.

FIGS. 2 to 5 show processes according to the invention which overcome the problems described above and in the prior art, providing an economically and environmentally improved solution for the reduction of methane loss and power consumption. The process according to the invention can be applied to both new biogas plants, but also revamps of existing biogas plants, such as the biogas plant as described and shown in FIG. 1.

FIG. 2 shows a process diagram of a biogas upgrade plant according to the invention. Unless otherwise stated in the following features of the process shown in FIG. 2 have substantially the same function and reference numerals as those of the process shown in FIG. 1.

In the process diagram shown in FIG. 2 first liquid effluent L1 is depressurized by valve V1 and fed to the bottom of a second absorption unit A7 and a second physical absorbing agent L3' is fed to the top of the second absorbing unit A7. The pressure in the second absorption unit A7 is higher than the pressure in flash unit A3. The stripper liquid effluent L3 from the bottom of stripping unit A4 is divided into the second physical absorbing agent L3' which is fed into the second absorber A7. As the pressure in stripper unit A4 is less than the pressure in A7 a pump is needed. In FIG. 2 this pump is an additional pump P2, but in an alternative embodiment the pump P1 could be used for both the second physical absorbing agent L3' and the first physical absorbing agent L4. As the first liquid effluent L1 is depressurized, dissolved gases will separate out at the bottom of the second absorber A7. The resulting gas phase, which is rich in carbon dioxide and contains small amounts of methane, will be contacted with the second physical absorbing agent L3'. As the partial pressure of carbon dioxide is much higher than the partial pressure of methane, mainly carbon dioxide will be absorbed by liquid stream L3', thereby generating a second liquid effluent L2' which is lean in methane but rich in carbon dioxide and a second gas effluent G4" which contains methane. The second liquid effluent L2' is depressurized and fed to flash unit A3. As the pressure of the flash is less than the pressure in A7, dissolved gases will be released, thereby generating the flash gas effluent G4 and the flash liquid effluent L2. The flash gas effluent G4 and the second gas effluent G4" are then mixed forming recycle gas stream G4', which is then fed into the biogas stream G1 by the suction of compressor A1, thereby forming mixed biogas stream G2.

By introducing the second absorber A7 the methane loss of the process is reduced and the flow rate of the recycle gas stream G4' is reduced, thus reducing the flow rate of mixed biogas stream G2. The lower flow rate of mixed biogas stream G2 frees up capacity in compressor A1, which reduces power consumption or allows for an increased flow rate of biogas stream G1, which further increases upgraded biogas production. Introducing the second absorber A7 may also allow the pressure of the flash unit A3 to be lower than in the process of FIG. 1, which also reduces methane loss. The improvement achieved by the processes of FIGS. 2 to 5 are detailed in the comparative examples below.

FIG. 3 shows a process diagram of a biogas upgrade plant according to the invention. Unless otherwise stated in the following features of the process shown in FIG. 3 have substantially the same function and reference numerals as those of the processes shown in FIG. 1 and FIG. 2.

The process of FIG. 3 is the process of FIG. 2, but wherein the flash gas effluent G4 is compressed in compressor A8 thereby generating pressurized flash gas effluent G4''' which is then fed to the bottom of the second absorber A7. By doing this the flow rate of the recycle gas stream G4' will drop as part of the pressurized flash gas effluent G4''' is absorbed in the liquid phase of the second absorber A7. This in turn allows for an increased biogas G1 flow rate at the same mixed biogas G2 flow rate as is used in the process of FIG. 2. The pressurized flash gas effluent G4''' has a high purity of carbon dioxide hence it will also have the effect of stripping off methane in the second absorber A7. Preferably, the pressurized flash gas effluent G4''' is fed to the second absorber A7 below the first liquid effluent L1 to maximize the methane transfer the gas phase. The second absorber A7 thus reduces the carbon dioxide transfer to the recycle gas stream G4' and increases the methane transfer to the recycle gas stream G4'. Hence, the methane loss of the process is reduced and the flow rate of G2 is reduced allowing for an increased biogas stream G1 at the same compressor A1 and first absorber A2 capacity. It is noted that the gas effluent of the second absorber A7 in FIG. 3 is denoted as the recycle gas stream G4' as it constitutes the gas which is recycled to compressor A1. However, recycle gas stream G4' is equivalent to the second gas effluent G4" in this embodiment.

The second absorber A7 can have at least one packed section, such as two packed sections, or a bottom part of the second absorber may be a bubble scrubber.

FIG. 4 shows a process diagram of a biogas upgrade plant according to the invention. Unless otherwise stated in the following the features of the process shown in FIG. 4 have substantially the same function and reference numerals as those of the processes shown in FIGS. 1 to 3.

The process of FIG. 4 is the process of FIG. 2, but wherein the TSA dryer A9 has three adsorption units A9', A9", A9'''. The dryer A9 is operated at system pressure, that is the pressure of the first gas effluent G3 as it exits the first absorber A2 is sufficient to drive the gas flows of dryer unit A9 without additional pressurization. The dryer unit A9 has a first adsorption unit A9', a second adsorption unit A9" and a third adsorption unit A9'''. The first gas effluent G3 is led to the first adsorption unit A9', which is in operation mode, wherein absorbing agent is adsorbed to generate an intermediate dried first gas effluent G7. The intermediate dried first gas effluent G7 is split into a regeneration stream G3" and a product stream G3'. The regeneration stream G3" is used to regenerate the second absorption unit A9", which is in regeneration mode, using a heating and cooling cycle as described for the dryer unit A6 of FIG. 1, yielding a spent regeneration stream G3'. The regeneration stream G3" is heated in heater E2. The spent regeneration stream G3' is cooled in cooler E3 to precipitate water, which is separated out in separation vessel A10 as dryer liquid effluent L5. The spent regeneration stream G3''' is then led to the third adsorption unit A9''', which is in recovery mode, wherein absorbing agent is adsorbed to generate a recovered regeneration stream G3''' which is added to the dried gas effluent G3'. Recovery mode thus refers to a state where the inflowing spent regeneration stream gas is dried. Once the regeneration of the first adsorption unit is required the modes of the three adsorption units are changed such the first adsorption unit is in regeneration mode, and the second adsorption unit is in recovery mode and the third adsorption unit is in operation mode. Hence the cycle of one adsorption unit is operation mode, then regeneration mode, then recovery mode and back to operation mode. The dryer A9 is shown schematically in FIG. 4, and a valve arrangement for handling the mode cycle is not shown. The pressure differential between the first gas effluent G3 and the dried gas effluent G3' is sufficiently small to drive the gas flows in the dryer unit A9, which includes that a small pressure differential between the dried gas effluent G3' and the regeneration stream G3" can drive the gas flows in the second and third adsorption units. As the regeneration stream G3" in this process is not recycled back into the biogas stream G1, the flow rate of mixed biogas G2 is reduced thus allowing for an increased flow rate of biogas G1 to increase production and/or reduced pressure in the flash unit A3 to reduce methane loss, while maintaining the same compressor A1 and first absorber A2 capacity. Thus, providing the dryer unit A9, may provide a reduced methane loss as the recycle gas stream G4' can be increased to recycle more methane from the second absorber A7 and/or flash unit A3.

FIG. 5 shows a process diagram of a biogas upgrade plant according to the invention. Unless otherwise stated in the following the features of the process shown in FIG. 5 have substantially the same function and reference numerals as those of the processes shown in FIGS. 1 to 4.

The process of FIG. 5 is the process of FIG. 3, but wherein the TSA dryer unit is the one from the process of FIG. 4. It is noted that the gas effluent of the second absorber A7 in FIG. 5 is denoted as the recycle gas stream G4' as constitutes the gas which is recycled to compressor A1, but that recycle gas stream G4' is equivalent to the second gas effluent G4" in this embodiment.

FIG. 6 shows a process diagram of a biogas upgrade plant according to the invention. Unless otherwise stated in the following the features of the process shown in FIG. 6 have substantially the same function and reference numerals as those of the processes shown in FIGS. 1 to 5.

The process of FIG. 6 is the process of FIG. 4, but wherein the first liquid effluent L1 is not depressurized and the second gas effluent is fed to the first absorber A7 as the recycle gas stream G4'. In this process the first absorber A2 and second absorber A7 have the same operating pressure and thus there is no need recompress the recycle gas stream G4'. The gas phase of the second absorber A7 is in this process provided by the flash gas effluent G4, which strips gas from the first liquid effluent, which gas is then absorbed by the second absorbing agent L3'.

FIG. 7 shows a process diagram of a biogas upgrade plant according to the invention. Unless otherwise stated in the following the features of the process shown in FIG. 7 have substantially the same function and reference numerals as those of the processes shown in FIGS. 1 to 6.

In the process of FIG. 7 the first absorber A2 has two sections, a first section A2' and a second section A2" respectively. The biogas stream G1 is fed through the mixed biogas stream G2 to the first absorber A2 at a position between the first and lower sections A2' A2". The first absorbing agent L4 is fed above the first section A2', resulting in counter current flows of gas and liquid through the first section A2'. Thereby gas is dissolved in the absorbing agent in the first section. Additionally, the flash gas effluent G4 is compressed in A8 and fed to the first absorber A2, at a position below the second section A2". This results in counter current flows of gas and liquid through the second section A2". Thereby the liquid flow from the first section is stripped by the gas in second section A2". As the flash gas effluent G4 has a high purity of carbon dioxide methane may be stripped from the liquid in the second section, while carbon dioxide is absorbed. In this process absorbing agent is not fed to the second section A2" separately and all the regenerated absorbing agent L3 is recycled as the first absorbing agent L3.

In FIG. 7. the first and second sections of the first absorber are shown as housed within the same unit with the first section A2' above the lower section A2", but the sections could be placed in separate units and they need not be placed.

It is within the knowledge of the skilled person to design an operate the absorbers, flash units, stripper units, and dryer optimally.

EXAMPLES

In the following a number of examples of biogas upgrading according to invention is provided to illustrate the invention and show at least some of the advantages thereof.

Computer simulation results of six process configurations are shown wherein:

Example I is a reference case of a known process for upgrading biogas corresponding to FIG. 1, Example II is a second reference case where the parameters of the process of Example I has been adjusted to reduce methane loss, Example III is an example according to the invention corresponding to FIG. 2, Example IV is an example according to the invention corresponding to FIG. 3, Example V is an example according to the invention corresponding to FIG. 4, and Example VI is an example according to the invention corresponding to FIG. 5.

The capacity and/or unit sizes are the same in each example.

The composition of the biogas feed used in each of the examples is shown in Table 1. The content of carbon dioxide in each example is about 58% by mass, with a carbon dioxide to methane ratio of about 1.5. Table 2 shows some of the process parameters of each example and the obtained methane loss, methane production and specific power consumption. Table 3 shows the obtained total flow rate, methane flow rate and carbon dioxide of the gas streams in the processes.

Methane loss is calculated as the amount of methane in the stripper gas effluent G5 relative to the amount of methane in the biogas stream G1. Methane production is the flow rate of upgraded biogas G3'. Specific power consumption is calculated as the ratio of power consumption to methane production in terms of $W/Nm^3$ methane.

TABLE 1

| Component in G1 | Unit | Example I | Example II | Example III | Example IV | Example V | Example VI |
|---|---|---|---|---|---|---|---|
| Methane | kg/hr | 735.26 | 679.32 | 733.44 | 764.55 | 742.56 | 800.13 |
| Water | kg/hr | 55.60 | 51.37 | 55.46 | 57.81 | 56.15 | 60.50 |
| Carbon Dioxide | kg/hr | 1086.07 | 1003.44 | 1083.39 | 1129.34 | 1096.86 | 1181.90 |
| Hydrogen Sulfide | kg/hr | 0.73 | 0.68 | 0.73 | 0.76 | 0.74 | 0.80 |

TABLE 2

| Component | Unit | Example I | Example II | Example III | Example IV | Example V | Example VI |
|---|---|---|---|---|---|---|---|
| G1 | bara | 1.01 | 1.01 | 1.01 | 1.01 | 1.01 | 1.01 |
| G3 | bara | 6.60 | 6.60 | 6.60 | 6.60 | 6.60 | 6.60 |
| G4 | bara | 2.70 | 2.10 | 2.10 | 2.05 | 2.00 | 2.05 |
| G4' | bara | — | — | 3.40 | 3.50 | 3.50 | 3.60 |
| G4" | bara | — | — | 3.40 | — | 3.50 | — |
| L1 | kg/hr | 271319 | 271475 | 271312 | 271217 | 271447 | 271274 |
| L2 | kg/hr | 271104 | 271017 | 286097 | 291143 | 286113 | 291198 |
| L2' | kg/hr | — | — | 286251 | 291375 | 286378 | 291564 |
| L3 | kg/hr | 270011 | 270007 | 285011 | 290013 | 285011 | 290015 |
| L3' | kg/hr | — | — | 15000 | 20000 | 15000 | 20000 |
| L4 | kg/hr | 269983 | 269983 | 269983 | 269983 | 269983 | 269983 |
| A1 | kW | 196.9 | 195.6 | 196.9 | 198.0 | 196.9 | 198.5 |
| A8 | kW | — | — | — | 3.7 | 0.0 | 4.8 |

TABLE 2-continued

| Component | Unit | Example I | Example II | Example III | Example IV | Example V | Example VI |
|---|---|---|---|---|---|---|---|
| P1 | kW | 61.9 | 61.9 | 61.9 | 61.9 | 61.9 | 61.9 |
| P2 | kW | 0.0 | 0.0 | 1.6 | 2.8 | 1.6 | 2.8 |
| Total power | kW | 258.8 | 257.6 | 260.3 | 266.3 | 260.4 | 268.0 |
| Specific power | W/N m$^3$CH$_4$ | 250.5 | 268.7 | 251.2 | 246.1 | 248.1 | 236.7 |
| relative specific power | % | — | 7.3 | 0.3 | −1.7 | −1.0 | −5.5 |
| Methane loss | % | 0.87 | 0.40 | 0.35 | 0.23 | 0.20 | 0.13 |
| Biomethane production | Nm$^3$/hr | 1033.2 | 958.6 | 1036.5 | 1082.0 | 1049.5 | 1132.6 |
| Biomethane increase | % | — | −7.2 | 0.3 | 4.7 | 1.6 | 9.6 |

TABLE 3

| Stream Identifier | Unit | Example I | Example II | Example III | Example IV | Example V | Example VI |
|---|---|---|---|---|---|---|---|
| G1 | Nm$^3$/hr | 1650.00 | 1524.46 | 1645.93 | 1715.73 | 1666.39 | 1795.59 |
| G2 | Nm$^3$/hr | 1865.68 | 1865.99 | 1865.57 | 1865.41 | 1865.70 | 1865.32 |
| G3 | Nm$^3$/hr | 1115.95 | 1041.19 | 1119.23 | 1164.83 | 1051.47 | 1134.65 |
| G3' | Nm$^3$/hr | 1033.21 | 958.58 | 1036.48 | 1081.99 | 1049.53 | 1132.55 |
| G3" | Nm$^3$/hr | 80.69 | 80.69 | 80.69 | 80.69 | 80.69 | 80.69 |
| G4 | Nm$^3$/hr | 134.99 | 260.84 | 86.47 | 127.12 | 143.70 | 194.56 |
| G4' | Nm$^3$/hr | — | — | 138.96 | 68.99 | 199.31 | 69.73 |
| G5 | Nm$^3$/hr | 2599.59 | 2553.36 | 2592.33 | 2614.00 | 2598.97 | 2640.28 |
| G6 | Nm$^3$/hr | 2019.89 | 2019.89 | 2019.89 | 2019.89 | 2019.89 | 2019.89 |
| G1 | kg CH$_4$/hr | 735.26 | 679.32 | 733.44 | 764.55 | 742.56 | 800.13 |
| G2 | kg CH$_4$/hr | 820.70 | 766.17 | 822.81 | 856.06 | 774.16 | 834.76 |
| G3 | kg CH$_4$/hr | 785.77 | 733.57 | 787.80 | 819.64 | 741.08 | 799.10 |
| G3' | kg CH$_4$/hr | 728.85 | 676.61 | 730.90 | 762.76 | 741.08 | 799.10 |
| G3" | kg CH$_4$/hr | 56.92 | 56.95 | 56.90 | 56.88 | 56.98 | 56.93 |
| G4 | kg CH$_4$/hr | 28.52 | 29.90 | 8.85 | 9.21 | 8.95 | 8.15 |
| G4' | kg CH$_4$/hr | — | — | 32.47 | 34.63 | 31.60 | 34.62 |
| G5 | kg CH$_4$/hr | 6.41 | 2.70 | 2.55 | 1.79 | 1.48 | 1.03 |
| G1 | kg CO$_2$/hr | 1086.07 | 1003.44 | 1083.39 | 1129.34 | 1096.86 | 1181.90 |
| G2 | kg CO$_2$/hr | 1272.91 | 1431.53 | 1266.36 | 1169.79 | 1398.57 | 1222.44 |
| G3 | kg CO$_2$/hr | 18.63 | 15.23 | 18.79 | 20.60 | 15.11 | 18.76 |
| G3' | kg CO$_2$/hr | 17.28 | 14.04 | 17.43 | 19.17 | 15.11 | 18.76 |
| G3" | kg CO$_2$/hr | 1.35 | 1.18 | 1.36 | 1.43 | 1.16 | 1.34 |
| G4 | kg CO$_2$/hr | 94.00 | 255.00 | 144.43 | 222.72 | 255.72 | 185.48 |
| G4' | kg CO$_2$/hr | — | — | 181.61 | 39.02 | 301.71 | 40.54 |
| G5 | kg CO$_2$/hr | 1068.79 | 989.39 | 1065.96 | 1110.16 | 1081.76 | 1163.13 |

Example I and II: Methane Loss Reduction in the Known/Prior Art Processes

Example II is the same process as Example I but wherein the pressure in the flash unit A3 has been reduced by 0.6 bar in order to reduce the methane slip. As can be seen in Table 2 this results in a methane slip reduction from 0.87% to 0.40%, i.e. a drop of 0.47 percentage points and about 54% reduction in methane slip. Because of the pressure reduction, the flow rate of the flash gas effluent G4 increases, thus necessitating a reduction of the flow rate of the biogas G1 and thus lowering the methane production and increasing the specific power consumption. The methane production is reduced by 7.2% and the specific power consumption is increased by about 7.3%. Hence, the reduction in methane loss is achieved at the expense of significantly reduced methane production and increased specific power consumption. The operating pressure of the absorber A2 is in each example 6.6 bara as indicated by the pressure of the first gas effluent G3.

As can be seen in Table 3, the mixed biogas stream G2 is substantially constant in the two examples, i.e. the capacity of the compressor A1 is the same in each example. This will be the case across all six examples.

Example III: Second Absorber According to the Invention

In example III the second absorber A7 is introduced, resulting in that the methane loss is reduced to 0.35%, compared to 0.87% and 0.40% for examples I and II respectively. However, the methane production is increased by 0.3% percentage points relative to example I. Thus, the introduction of the second absorber A7 yields a further reduction in methane loss compared to the pressure reduction of Example II, while delivering a production increase rather than significant decrease. The specific power consumption is increased by about 0.3% compared to example I. The operating pressure of the first absorber A2 is 6.6 bara and the operating pressure of the second absorber A7 is 3.4 bara.

In Table 3 it is shown that the flow rate of the recycle gas stream G4' in example III is 138.96 Nm$^3$/hr compared to the flash effluent streams G4 of Examples I and II of 134.99 Nm³/hr and 260.84 Nm³/hr, respectively. The reduced recycle flow rate allows for an increased flow of biogas G1 as the capacity of the compressor A8 is limiting, resulting in the increased production.

Example IV: Flash Gas Fed to Second Absorber According to the Invention

In Example IV the flash gas effluent G4 is compressed in compressor A8 and fed to the second absorber A7. The result is a reduction in the methane loss to 0.23%, a 4.7% increase in methane production and a 1.7% decrease in specific power consumption relative to Example I. Compared to the results of Example III this is a further reduction of methane loss by 0.17 percentage points, a further increase of 4.4 percentage point in methane production and a decrease of 2.0 percentage point in specific power consumption. The operating pressure of the first absorber A2 is 6.6 bara and the operating pressure of the second absorber A7 is 3.5 bara.

In Table 3 it is shown that the recycle gas stream G4' in Example IV is 68.99 Nm³/hr compared to the 138.96 Nm³/hr of Example III, which allows for an increased biogas stream G1 and thus increased production. As shown by the specific power consumption, the additional power requirement of the compressor A8 does not outweigh the attained increased production.

Example V: Second Absorber and Dryer with Three Adsorption Units According to the Invention Example V shows the effect of introducing the dryer with three adsorption units into the process of Example III. The result is a reduction in the methane loss to 0.20%, a 1.6% increase in methane production and a 1.0% decrease in specific power consumption relative to Example I. Compared to the results of Example III the dryer provides a further reduction of the methane loss by 0.20 percentage points, a further increase of 1.3 percentage point in methane production and a decrease of 1.3 percentage points in specific power consumption. The operating pressure of the first absorber A2 is 6.6 bara and the operating pressure of the second absorber A7 is 3.5 bara.

As is shown in Table 3 eliminating the recycle of the spent regeneration stream G3" frees up capacity in compressor A8 allowing for an increased biogas stream G1 and thus the increased production.

Example VI: Flash Gas Fed to Second Absorber and Dryer with Three Adsorption Units Example VI shows the effect of introducing the dryer with three adsorption units into the process of Example IV. The result is a reduction in the methane loss to 0.13%, an 9.6% increase in methane production and a 5.5% decrease in specific power consumption relative to Example I. Compared to the results of Example IV the dryer provides a further decrease in methane loss by 0.10 percentage points, a further increase of 5.9 percentage points in methane production and a further decrease of 3.3 percentage points in specific power consumption. The operating pressure of the first absorber A2 is 6.6 bara and the operating pressure of the second absorber A7 is 3.6 bara.

The examples demonstrate that a method or processing plant according to the invention may reduce the methane loss, increase the methane production and reduce the specific power consumption compared to known methods for a plant with a given compressor capacity.

A minimum of optimization effort has been made in procuring the above results which are mainly suited to report the performance improvement of processes according to the invention compared the known process of FIG. 1. The achieved results may therefore be considered a minimum of process performance improvement.

LIST OF REFERENCES

Reference Name
 G1 Biogas stream
 G2 Mixed biogas stream
 G3 First gas effluent
 G3' Dry gas effluent (upgraded biogas)
 G3" Regeneration stream
 G3'" Spent regeneration stream
 G3'''' Recovered regeneration stream
 G4 Flash gas effluent
 G4' Recycle gas stream
 G4" Second gas effluent
 G4' Compressed flash gas effluent
 G5 Stripper gas effluent
 G6 Stripper gas feed
 G7 Intermediate dry gas effluent
 L1 First liquid effluent
 L1' Depressurized first liquid effluent
 L2 Flash liquid effluent
 L2' Second liquid effluent
 L3 Regenerated absorbing agent
 L3' Second absorbing agent
 L4 First absorbing agent
 L5 Dryer liquid effluent
 A1 First compressor
 A2 First absorber
 A2' First section of first absorber
 A2" Second section of the first absorber
 A3 Flash unit
 A4 Stripper unit
 A5 Stripper gas compressor
 A6 TSA Dryer
 A7 Second absorber
 A8 Second compressor
 A9 TSA dryer with three adsorption units
 A9' First adsorption unit
 A9" Second adsorption unit
 A9'" Third adsorption unit
 A10 Separation vessel

What is claimed is:

1. A method for upgrading a biogas stream comprising methane and carbon dioxide, the method comprising the steps of:
   a) feeding the biogas stream and a first liquid physical absorbing agent to a first absorber,
   b) absorbing carbon dioxide and methane from the biogas stream into the first physical absorbing agent thereby obtaining a first gas effluent having a lower content of carbon dioxide than the biogas stream and a first liquid effluent having higher content of carbon dioxide than the first absorbing agent,
   c) feeding the first liquid effluent to a second absorber and feeding a second liquid physical absorbing agent to the second absorber, whereby carbon dioxide released from the first liquid effluent is subsequently absorbed into the second physical absorbing agent, thereby obtaining a second gas effluent comprising methane and a second liquid effluent having a lower content of methane than the first liquid effluent, d) depressurizing and feeding the second liquid effluent into a flash unit, e) flashing the depressurized second liquid effluent thereby obtaining a flash gas effluent comprising methane and a flash liquid effluent having a lower content of methane than the second liquid effluent, f) feeding the flash gas effluent into the second absorber or into the biogas stream of step a), g) feeding the second gas effluent into the first absorber optionally through the biogas stream of step a), and h) recovering or further processing the first gas effluent as an upgraded biogas stream.

2. The method according to claim 1, further comprising the steps of:

i) feeding the flash liquid effluent and a stripper gas feed into a stripper unit, and j) stripping the flash liquid effluent with the stripper gas feed thereby obtaining a stripper gas effluent having a higher content of carbon dioxide than the stripper gas feed and a regenerated physical absorbing agent.

3. The method according to claim 2, further comprising the step of:

k) feeding a first portion of the regenerated physical absorbing agent from step j. as the first physical absorbing agent of step a. and feeding a second portion of the regenerated absorbing stream from step j. as the second physical absorbing agent of step c).

4. The method according to claim 1, wherein the flash gas effluent is compressed and fed into the second absorber, and the second gas effluent is fed into the biogas stream.

5. The method according to claim 1, where in step c) the first liquid effluent and flash gas effluent are fed into the second absorber at a first position and second position respectively, wherein the second position is below the first position in a height direction of the second absorber.

6. The method according to claim 5, wherein an operating pressure of the first absorber and the second absorber are substantially the same, and the second gas effluent is fed to the first absorber of step a).

7. The method according to claim 1, where the first liquid effluent is depressurized by at least 0.5 bara bar, preferably at least 1 bar.

8. The method according to claim 1, wherein the biogas stream is pressurized prior to feeding it to the first absorber.

9. The method according to claim 8, wherein the biogas stream is obtained directly from a biogas production unit.

10. The method according to claim 8, wherein the biogas stream is provided at about 1 to 1.5 bara, prior to being pressurized for feeding into the first absorber.

11. The method according to claim 1, wherein a mass ratio of carbon dioxide to methane ratio in the biogas stream is at or above 1:2.

12. The method according to claim 1, wherein an operating pressure of the first absorber is about 3 bara to 16 bara.

13. The method according to claim 1, wherein an operating pressure of the second absorber is lower than the pressure of the first absorber and wherein the pressure is at about 2 to 8 bara.

14. The method according to claim 1, wherein an operating pressure of the flash unit is about 1.5 bara to 6 bara.

15. The method according to claim 1, wherein the first and second physical absorbing agent are selected from water, methanol, NMP or mixtures of dimethyl ethers of polyethylene glycol.

16. The method according to claim 1, further comprising the steps of:

l) feeding the first gas effluent into a separation unit, m) separating physical absorbing agent contained in the first gas effluent from the first gas effluent, thereby obtaining a dry gas effluent having a lower content of physical absorbing agent than the first gas effluent and recovering or further processing the dry gas effluent as an upgraded biogas stream.

17. The method according to claim 16, wherein the separation unit is a temperature swing absorption dryer comprising at least three adsorption units, and step m) comprises the steps of:

adsorbing physical absorbing agent from the first gas effluent in a first of the adsorption unit, thereby obtaining an intermediate dry gas effluent, feeding a first portion of the intermediate dry gas effluent to a second adsorption unit as a regeneration stream, regenerating the second adsorption unit with the regeneration stream, thereby obtaining a spent regeneration stream, adsorbing physical absorbing agent from the spent regeneration stream in a third adsorption unit, thereby obtaining a recovered regeneration stream, adding the recovered regeneration stream to a second portion of the intermediate dry gas effluent, thereby obtaining the dry gas effluent, and recovering the dry gas effluent as an upgraded biogas.

18. The method according to claim 17, wherein an operating pressure of the first absorber drives the gas flow in the at least three adsorption units.

19. A biogas upgrading plant, configured for using a method according to claim 1.

20. The method according to claim 1, wherein the first liquid effluent is depressurized and fed to the second absorber.

21. The method according to claim 1, wherein the first liquid effluent is not depressurized and fed the second absorber and the flash gas effluent is fed to the second absorber.

22. The method according to claim 21, wherein the second the first and second absorber have substantially the same operating pressures.

23. The method according to claim 1, where the first liquid effluent is depressurized by at least 1 bara.

24. The method according to claim 1, wherein a mass ratio of carbon dioxide to methane ratio in the biogas stream is in a range of 3:1 to 1:2.

25. The method according to claim 1, wherein a mass ratio of carbon dioxide to methane ratio in the biogas stream is in a range of 2:1 to 1:1.

26. The method according to claim 1, wherein an operating pressure of the first absorber is about 5 to 8 bara.

27. The method according to claim 1, wherein an operating pressure of the first absorber is about 8 to 12 bara.

28. The method according to claim 1, wherein an operating pressure of the second absorber is lower than the pressure of the first absorber and wherein the pressure is at about 3 to 5 bara.

29. The method according to claim 1, wherein an operating pressure of the flash unit is about 1 about 1.5 to 3 bara.

30. The method according to claim 1, wherein the first and second physical absorbing agents are the same and are selected from water, methanol, NMP or mixtures of dimethyl ethers of polyethylene glycol.

31. A method for upgrading a biogas stream comprising methane and carbon dioxide, the method comprising the steps of:
- a) feeding the biogas stream into a first absorber, the first absorber having a first section and a second section, wherein the first section is positioned above the second section, and the biogas stream is fed to the first absorber at a position between the first and second sections of the first absorber,
- b) feeding a first liquid physical absorbing agent to the first absorber at a position above the first section,
- c) absorbing carbon dioxide and methane from the biogas stream into the first physical absorbing agent thereby obtaining a first gas effluent having a lower content of carbon dioxide than the biogas stream and a first liquid effluent having higher content of carbon dioxide than the absorbing stream,
- d) depressurizing and feeding the first liquid effluent into a flash unit,
- e) flashing the depressurized first liquid effluent thereby obtaining a flash gas effluent comprising methane and a flash liquid effluent having a lower content of methane than the second liquid effluent,
- f) compressing and feeding the flash gas effluent into the first absorber at a position below the second section of the first absorber,
- g) recovering or further processing the first gas effluent as an upgraded biogas stream.

* * * * *